(12) United States Patent
Kirchmair

(10) Patent No.: US 12,487,027 B2
(45) Date of Patent: Dec. 2, 2025

(54) COOLING PLATE ASSEMBLY AND METHOD

(71) Applicant: Single Use Support GmbH, Kufstein (AT)

(72) Inventor: Johannes Kirchmair, Brandenberg (AT)

(73) Assignee: SINGLE USE SUPPORT GMBH, Kufstein (AT)

( * ) Notice: Subject to any disclaimer, the term of this patent is extended or adjusted under 35 U.S.C. 154(b) by 547 days.

(21) Appl. No.: 17/191,211

(22) Filed: Mar. 3, 2021

(65) Prior Publication Data

US 2021/0190417 A1 Jun. 24, 2021

Related U.S. Application Data

(63) Continuation of application No. PCT/AT2019/060285, filed on Sep. 3, 2019.

(30) Foreign Application Priority Data

Sep. 5, 2018 (AT) .............................. A 50754/2018

(51) Int. Cl.
*F25D 31/00* (2006.01)
*F25D 21/00* (2006.01)

(52) U.S. Cl.
CPC ............ *F25D 31/001* (2013.01); *F25D 21/00* (2013.01)

(58) Field of Classification Search
CPC ........ F25D 31/001; F25D 25/00; F25D 15/00; F25D 19/00; F25D 21/00; F25D 2021/005; A61J 2200/40; A61J 2200/44; A61J 1/165

See application file for complete search history.

(56) References Cited

U.S. PATENT DOCUMENTS

| | | | |
|---|---|---|---|
| 1,896,953 A | | 2/1933 | Hassell |
| 2,235,209 A | * | 3/1941 | Fletcher, Jr. ........... B65D 81/18 |
| | | | 426/393 |
| 3,908,749 A | * | 9/1975 | Williams .............. A47J 39/006 |
| | | | 219/403 |
| 4,203,486 A | | 5/1980 | Rubbright et al. |
| 4,285,391 A | * | 8/1981 | Bourner ................ A47J 39/006 |
| | | | 219/403 |

(Continued)

FOREIGN PATENT DOCUMENTS

| | | |
|---|---|---|
| AT | 520285 | 3/2019 |
| CN | 103080674 | 5/2013 |

(Continued)

OTHER PUBLICATIONS

International Search Report issued Nov. 18, 2019 in International (PCT) Application No. PCT/AT2019/060285.

(Continued)

*Primary Examiner* — Jenna M Maroney
(74) *Attorney, Agent, or Firm* — Wenderoth, Lind & Ponack, L.L.P.

(57) ABSTRACT

A cooling plate assembly includes at least one cooling plate which is mounted on a support. The areal extension of the at least one cooling plate protrudes freely away from the support such that the at least one cooling plate can be introduced into a hollow body and removed from the hollow body via an opening by moving the support.

22 Claims, 4 Drawing Sheets

(56) References Cited

U.S. PATENT DOCUMENTS

| | | | |
|---|---|---|---|
| 4,323,110 A | 4/1982 | Rubbright et al. | |
| 4,558,572 A | 12/1985 | Aoki et al. | |
| 4,898,294 A | 2/1990 | Jennings | |
| 5,404,935 A * | 4/1995 | Liebermann | A47J 39/006 165/918 |
| 5,524,451 A * | 6/1996 | Tippmann | A23B 7/0433 62/352 |
| 6,453,683 B1 | 9/2002 | Wisniewski et al. | |
| 6,631,616 B2 | 10/2003 | Wisniewski et al. | |
| 6,635,414 B2 | 10/2003 | Wisniewski | |
| 6,684,646 B2 | 2/2004 | Voute et al. | |
| 6,698,213 B2 | 3/2004 | Voute et al. | |
| 6,786,054 B2 | 9/2004 | Voute et al. | |
| 6,945,056 B2 | 9/2005 | Brown et al. | |
| 6,996,995 B2 | 2/2006 | Voute et al. | |
| 7,104,074 B2 | 9/2006 | Voute et al. | |
| 7,137,261 B2 | 11/2006 | Brown et al. | |
| 7,353,658 B2 | 4/2008 | Voute et al. | |
| 8,012,416 B2 * | 9/2011 | Kuzyk | A61M 1/0281 422/38 |
| 8,371,132 B2 * | 2/2013 | Cutting | B01F 35/421 62/66 |
| 8,448,457 B2 * | 5/2013 | Cutting | A01N 1/0252 62/530 |
| 9,151,770 B2 * | 10/2015 | Reuteler | G01N 35/1095 |
| 9,677,804 B2 | 6/2017 | Resch | |
| 10,006,760 B2 | 6/2018 | Cousaert et al. | |
| 2002/0177119 A1 | 11/2002 | Wisniewski | |
| 2003/0066295 A1 | 4/2003 | Wisniewski et al. | |
| 2003/0079482 A1 | 5/2003 | Voute et al. | |
| 2003/0080126 A1 | 5/2003 | Voute et al. | |
| 2004/0006999 A1 | 1/2004 | Brown et al. | |
| 2004/0129003 A1 | 7/2004 | Voute et al. | |
| 2004/0134203 A1 | 7/2004 | Voute et al. | |
| 2005/0011202 A1 | 1/2005 | Voute et al. | |
| 2005/0180998 A1 * | 8/2005 | Brown | A61M 1/0277 62/1 |
| 2005/0217306 A1 * | 10/2005 | Renaud | A47F 3/04 62/465 |
| 2007/0084222 A1 | 4/2007 | Voute et al. | |
| 2007/0125098 A1 | 6/2007 | Voute et al. | |
| 2008/0178613 A1 * | 7/2008 | Smith | F25D 15/00 62/380 |
| 2013/0152623 A1 | 6/2013 | Resch | |
| 2015/0075208 A1 * | 3/2015 | Lockwood | F25D 11/003 62/407 |
| 2015/0107292 A1 | 4/2015 | Cousaert et al. | |
| 2019/0224074 A1 | 7/2019 | Wurm | |
| 2020/0217579 A1 | 7/2020 | Wurm | |

FOREIGN PATENT DOCUMENTS

| | | | |
|---|---|---|---|
| CN | 205090700 | 3/2016 | |
| CN | 105939931 | 9/2016 | |
| CN | 207467343 | 6/2018 | |
| EP | 2902736 A1 * | 8/2015 | F25D 31/001 |
| FR | 2 553 626 | 4/1985 | |
| FR | 2 749 931 | 12/1997 | |
| KR | 89-353 | 3/1989 | |
| WO | 93/20394 | 10/1993 | |
| WO | WO-9320394 A1 * | 10/1993 | A23L 3/36 |
| WO | 96/10723 | 4/1996 | |
| WO | 2005/075907 | 8/2005 | |
| WO | WO-2011048031 A1 * | 4/2011 | F25D 31/001 |
| WO | 2018/129576 | 7/2018 | |

OTHER PUBLICATIONS

Mortech Manufacturing, "1036-R116 with m677", *Youtube*, Jul. 2, 2014, p. 1, XP054979865, see video at 2:37 and 2:35.

* cited by examiner

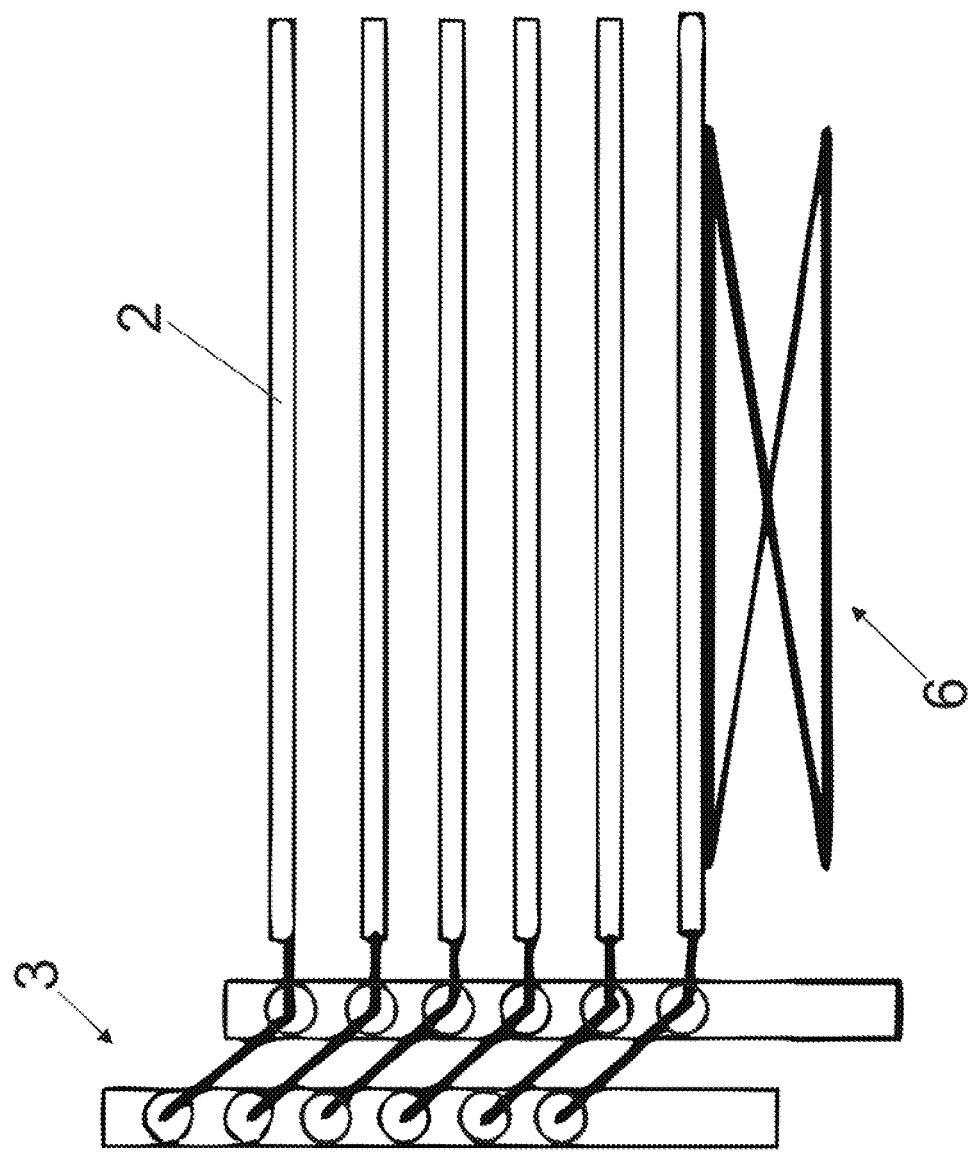

COOLING PLATE ASSEMBLY AND METHOD

BACKGROUND OF THE INVENTION

The present invention concerns a cooling plate assembly, a body arrangement, and a method of temperature control, in particular freezing and/or defrosting, of material in containers, in particular a liquid.

U.S. Pat. No. 4,898,294 discloses containers for frozen foodstuffs for serving in an aircraft.

US 2003/0080126 A1 discloses a system for the controlled freezing and defrosting of biopharmaceutical material. That system uses cooling plates which are always fixedly installed.

In relation to the pharmaceutical, in particular biopharmaceutical, production process, it is state of the art for the material produced, in particular a liquid, to be frozen in relatively large amounts and in the frozen state taken to that installation in which portioning or filling—therefore generally making up—the containers for the end consumers (patients) or for use by the medical staff is effected.

In that respect, for example bottles with up to a capacity of 10 l or so-called single use bags with a capacity of up to 16 l are frozen. It is also known to use stainless steel tanks in which the product produced is frozen. The above-mentioned single use bags substantially involve flexible bags which are preferably made from plastic and which if possible are not only liquid-tight but also provide as good protection as possible from for example contamination.

What is problematic with the procedure in accordance with that state of the art is that the disposable containers (bottles, single use bags) have to be put into an apparatus for freezing and also have to be removed after freezing by hand. Theoretically, there would naturally be the alternative of automating those operations, but that would involve a very high level of complication and expense.

Stainless steel tanks which in principle are reusable also involve the problem that their weight is very high and that satisfactory decontamination/sterilization can only be implemented with very great difficulty in many cases.

SUMMARY OF THE INVENTION

Therefore, the object of the present invention is to provide methods and/or apparatuses, by means of which freezing and/or transport of materials, in particular liquids or intermediate products or end products of the biopharmaceutical production process, is to be simplified.

By virtue of the fact that the at least one cooling plate in respect of its area extent projects freely away from the carrier so that the at least one cooling plate can be introduced into a hollow body and can be removed from the hollow body by way of an opening by moving the carrier the disposable containers no longer have to be introduced or moved into a corresponding apparatus but the at least one cooling plate can be introduced into that hollow body in which the containers for the material (for example with the above-mentioned disposable containers) are already disposed.

The concept which has always been known of a cooling chamber for freezing is therefore completely discarded and replaced by an implementation adapted to the specific requirements of the biopharmaceutical production process.

The invention, however, can always be used when handling of the material to be frozen is not wanted (because for example as in the case of the biopharmaceutical production process sterility or integrity of the material or the bag could be established).

Complementarily to the cooling plate assembly according to the invention, the invention provides a body arrangement of containers to be temperature-controlled. Provided in the hollow body arrangement are holding devices for spaced holding of the containers in the hollow body arrangement, which are so arranged that at least one cooling plate can be introduced and removed by way of the opening between the containers. By virtue of that body arrangement according to the invention, it is possible for the containers to be cooled to be arranged in a particularly simple fashion in such a way that introduction of the cooling plate assembly is to be implemented particularly easily and quickly. It is to be mentioned that introducing the cooling plate assembly can be effected by movement of the carrier of the at least one cooling plate relative to the body arrangement. In that respect, in the context of the invention, it is in principle not relevant whether the body arrangement is moved and the cooling plate assembly is at rest, the cooling plate assembly is moved and the body arrangement is at rest or the two move relative to each other.

It is also to be mentioned that the cooling plate assembly can have at least two cooling plates, but generally more cooling plates will be used. By using two cooling plates it is possible to ensure that a container to be cooled is cooled on both sides. It will be appreciated that structures with only one single cooling plate are also conceivable in principle. It is equally possible that only one single container per freezing operation is cooled with the cooling plate assembly. In general naturally it will be more.

To make the text as easily readable as possible the at least one cooling plate is identified with the term "cooling plates" in the plural, in which respect the meaning also always includes the "at least one cooling plate".

The containers can directly contain the material to be frozen or it can be provided that the above-mentioned single use bags, bottles or tanks are arranged in the containers. The containers can be in particular of the design configuration as in international application WO 2018/129576, to the disclosure of which attention is directed in relation to the design of the container and the objects arranged therein (for example lining foam, arrangement of the single use bag).

It should also be mentioned that the cooling plates do not have to be completely flat. In certain situations, it can certainly be advantageous to use curved plates or plates of a different shape. In principle, the term plates is used to denote members, the area extent of which is a multiple greater than the thickness. In principle the ratio of a characteristic dimension of the area extent and the plate thickness can be greater than 2, preferably greater than 10 and particularly preferably greater than 20.

A core aspect of the invention is that the cooling plates of the cooling plate assembly are mounted in cantilever relationship in such a way that they can be introduced into that space in which the containers to be cooled are already present.

It is to be mentioned that the invention can be used not only for freezing the material in the containers but also for thawing frozen material in the containers—preferably in temperature-controlled fashion.

In principle, the invention can even be used for heating. Instead of cooling plates it is then possible to use heating plates or in general terms temperature-controlled plates.

In addition, an arrangement comprises a cooling plate assembly and a body arrangement according to the invention.

A method of temperature control, in particular freezing and/or defrosting, of material in the containers, in particular a liquid, is also provided.

The cooling plates can have a substantially rectangular area, which represents a particularly simple configuration of the invention.

The cooling plates can be supported exclusively at the edge. For example, the cooling plates can be supported only at one side at the edge. A peripherally extending supporting device (for example in the form of a frame projecting away from the carrier) can also be used if it is so designed that the cooling plates can be introduced into the hollow body and removed from the hollow body by moving the carrier by way of the opening.

The support means for the cooling plates, for example in the form of a frame, must however be of such a design that introduction and removal of the at least one cooling plate in accordance with the invention is possible, for example by the frame being of a sufficiently thin structure.

In principle, central support would also be conceivable. It will be noted, however, that it will then be difficult to construct the apparatus in such a way that there is contact between the cooling plates and the containers, that promotes the transfer of heat from the containers to the cooling plates—that is to say the removal of heat from the containers.

There can be provided a plurality of cooling plates which are mounted on the carrier and which overlap and which are free relative to each other, i.e. they are at a distance from each other so that a free space is present between them. The term "overlap" in that respect can mean that the cooling plates overlap in a view along an axis perpendicular to the planes of the cooling plates. The mutually overlapping cooling plates can be arranged substantially one above the other.

The cooling plates can be mounted moveably substantially perpendicularly to the area extent of the cooling plates in order to bring about contact between the cooling plates and the containers after introduction of the cooling plates into the hollow body. That can be effected in a particularly simple fashion in combination with cooling plates which are arranged substantially one above the other, whereby contact can be brought about by lifting and the force of gravity can ensure automatic return of the cooling plates. A motion device can be provided for moving the cooling plates. That can be supported on the carrier similarly to the cooling plates and can be introduced into the body arrangement. In that way it is particularly easily possible to provide the lifting function—or in general terms the motion function—in the body arrangement without each body arrangement having to separately have a motion device.

In a particularly simple embodiment of the invention, the motion device can be in the form of a scissors lift.

The cooling plates can have temperature control passages for a temperature control medium and there can be provided a device by means of which the temperature control medium is temperature-controlled and is pumped through the temperature control passages. It is to be noted that the expression "temperature control" can mean both cooling and also heating as well as closed-loop or open-loop controlled implementation of a temperature profile. It will be appreciated that freezing, defrosting, or multiple change between the two phase states can be provided in the context of the temperature profile.

The holding devices according to the invention for the containers can be in the form of projections in the hollow body for supporting the containers. That applies in particular when the containers are arranged substantially one above the other. The containers then simply rest on the projections and are particularly simple to lift for example by a lifting device. In that way contacting of the cooling plates and the containers can be particularly easily brought about.

The holding devices, however, do not necessarily have to be in the form of projections. By way of example, the containers can be respectively disposed in an arrangement in mutually juxtaposed relationship in the hollow body. For example, in such a case, the containers can be held by way of clips or other fixing devices which are preferably displaceable by way of rails.

In a particularly simple embodiment, the projections can be arranged parallel to a direction for introducing the containers.

The possibility of making contact between the cooling plates and the containers has already been referred to, in which respect contacting is possible between all adjacent containers and cooling plates.

The hollow body can preferably be made from a heat-insulating material to make cooling as efficient as possible. That also has the advantage that the frozen material in the containers remains for some time in itself in a frozen state even after the cooling plate arrangement is moved out. In that way it is possible in a particularly simple fashion to bridge over periods of time in which ongoing temperature control is not immediately possible, for example to move the body arrangement into a cooled store or in especial cases to carry out actual transport immediately. In the applicant's tests it was possible readily to bridge over two hours until putting it into a temperature-controlled store.

Accordingly, a further advantage of the body arrangement according to the invention is that the body arrangement itself can also serve for transporting the containers. For that purpose, the body arrangement can rest for example on a pallet which are particularly easy to move in the framework of storage technology which is available in most cases.

In addition, heat insulation for controlled freezing can be afforded for the containers by the body arrangement which is made from heat-insulating material, in accordance with unpublished Austrian patent application A 50778/2017.

The containers arranged in the body arrangement can preferably rest by way of extensions on the projections, which can extend the travel distance over which the containers are to be lifted in the body arrangement, by the extensions being substantially thinner than the container itself.

Reference was already made to the fact that a motion device can also be introduced into the hollow body in order to easily perform movement of the cooling plates for producing contacting thereof. For that purpose, a free space for the motion device for introducing and removing the cooling plates can be provided in the hollow body.

BRIEF DESCRIPTION OF DRAWINGS

Further advantages and details of the invention will be apparent from the following description in connection with the drawings, in which:

FIGS. 1a to 1c are various views of a cooling plate assembly according to the invention and the body arrangement according to the invention.

DETAILED DESCRIPTION OF THE INVENTION

Figure 1A:
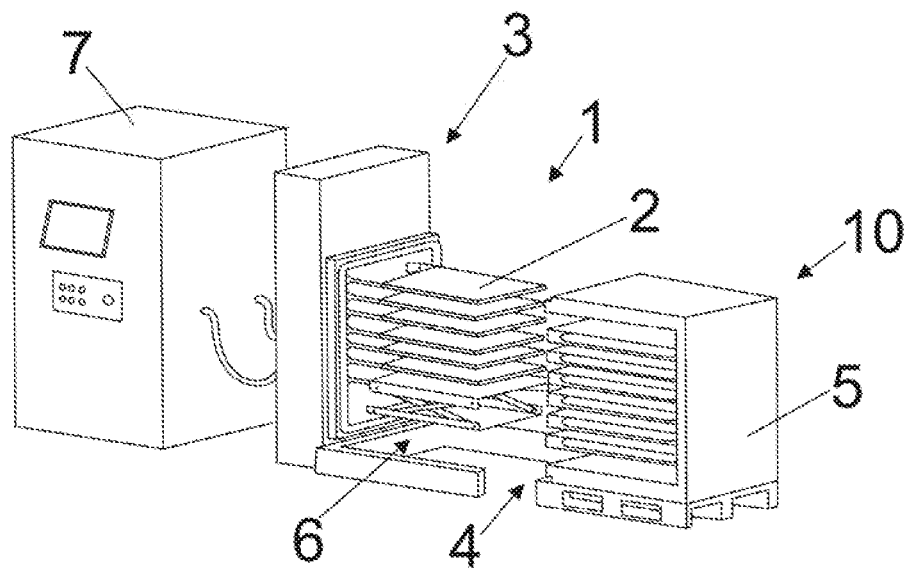

FIG. 1a (partially sectioned perspective view): cooling plates 2 of the cooling plate assembly 1 project freely away from the carrier 3, wherein the cooling plates 2 are so supported that they are accessible at three sides. The cooling plates 2 are respectively displaceable individually or all at the same time in parallel relationship in respect of height so that the spacing among the cooling plates 2 can be altered individually or all spacings jointly. The structure involves at least two cooling plates 2 which are displaceable parallel and in height, but in most cases it is to be assumed that between 5 and 10 cooling plates 2 are used. Those cooling plates transmit the cold or heat directly to the material to be frozen or defrosted. The cooling and heating power for the plate supply can come from a unit (apparatus 7) connected to the carriers 3. The apparatus 7 can be integrated into the carrier 3 or can be separate theon.

The cooling plates 2 can be made from aluminum, copper or preferably stainless steel. Energy transmission to the cooling plates 2 is effected by way of brine, glycol thinners or preferably silicone oil as the temperature control medium. The freezing temperature can be set down to −20° C., in most cases in practical use however the temperature is preferably between −50° C. and −80°.

The containers 8 are containers or housings as are disclosed in international application WO 2018/129576. In particular the (single use) bags lie in a tray (housing) which is equipped at the edge and in the hose region with a foam which accommodates the expansion in volume of the liquid in the freezing process and then hardens. In that way the filled-frozen-expanded bag is immobilized so that any movement in the frozen state is prevented. As movement of the plastic materials would lead to breakages that is advantageous.

Figure 1B:
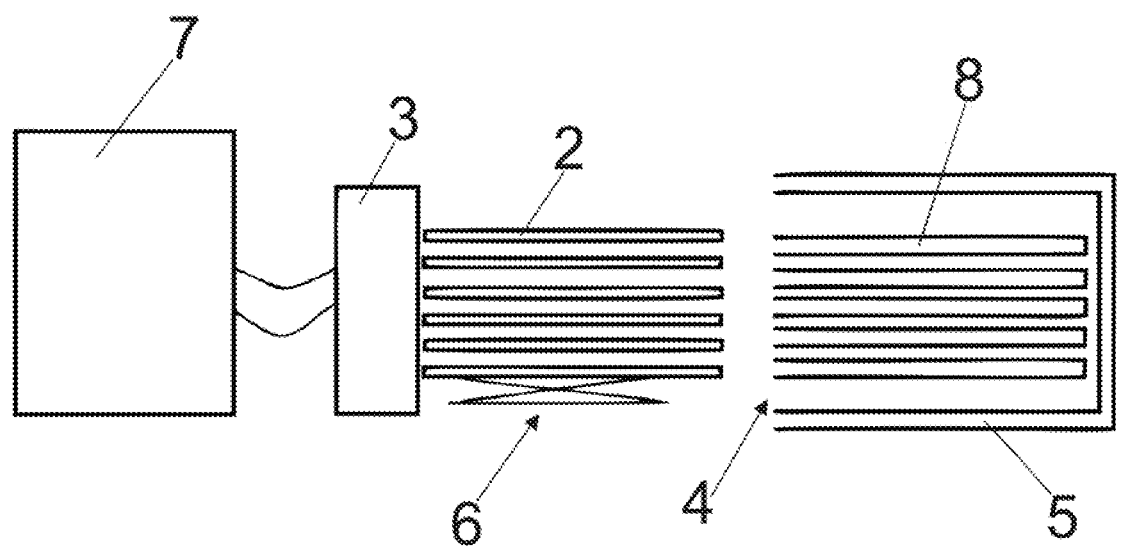

The view in FIG. 1b corresponds to that in FIG. 1a but is a side view.

FIG. 1c shows an alternative structure for mounting the cooling plates 2 on the carrier 3.

Figure 2A:
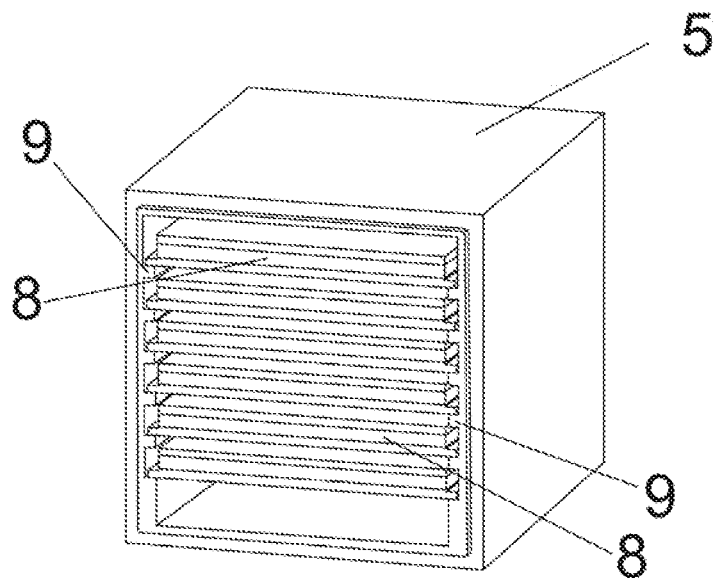
FIGS. 2a and 2b are various views of the body arrangement according to the invention in itself.

FIG. 2a: the material to be frozen/defrosted is disposed in a body arrangement 10 of heat-insulating material, which has the hollow body 5. The body arrangement 10 can comprise foam material, plastics or fiber composite or composite materials. The function thereof is to give stability for the primary packaging (container 8), to permit robust logistics and to insulate the interior from external influences (UV, temperature, moisture, access and so forth). Disposed in that body arrangement 10 are a plurality of mutually superposed containers 8 which are to be frozen/defrosted. Those individual containers 8 lie on a respective projection and are displaceable individually upwardly. Those projections form the holding devices 9. After the force which displaces them upwardly is removed the individual containers automatically go back into the lower rest position under the force of gravity. The body arrangement is completely closed, is disposed on a load carrier, preferably a pallet, and has an opening 4 to introduce the cooling plates 2 and to convey liquid into and out of same. That is effected preferably but not exclusively with sterile connectors (for example CPC Colder ASQG).

Figure 2B:
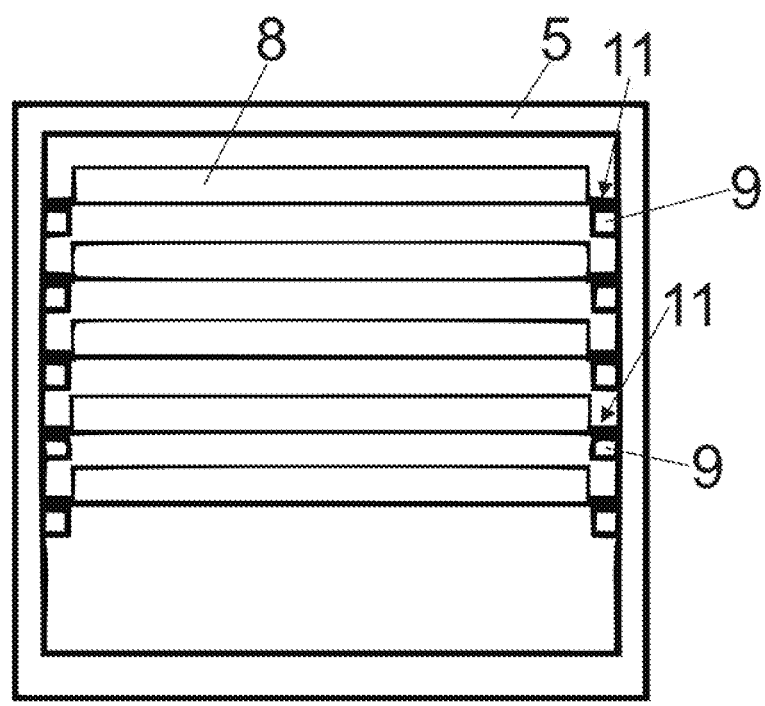

FIG. 2b corresponds to FIG. 2a but is a front view of the body 5. The extensions 11 with which the containers 8 sit on the holding devices 9 in the form of projections can be clearly seen.

Figure 3:
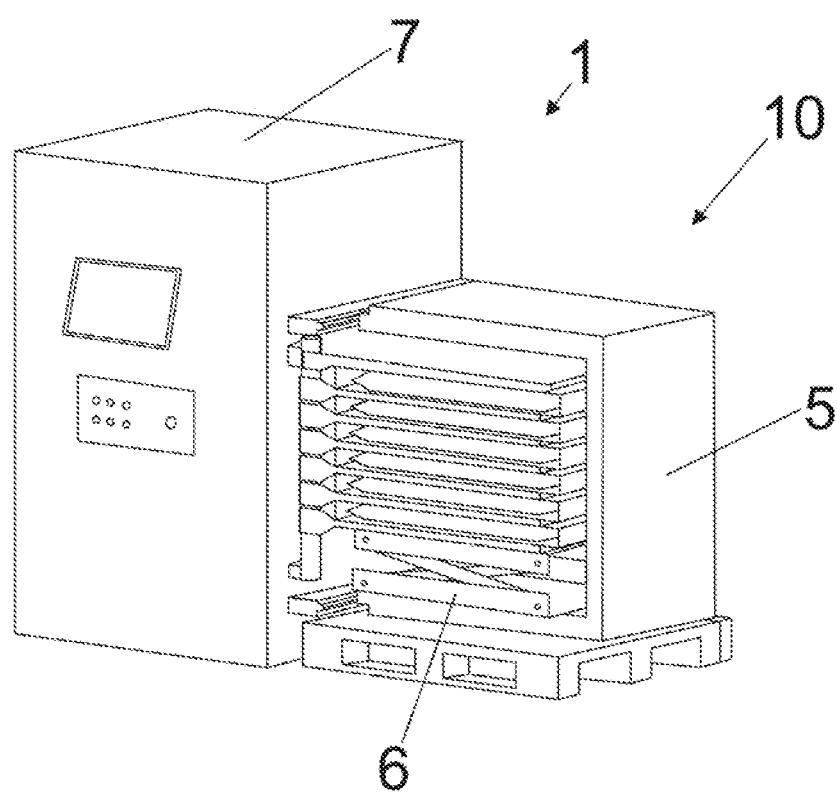
FIG. 3 shows the arrangement according to the invention in the form of the cooling plate assembly and the body arrangement in the inserted state of the cooling plates.

At the beginning of the freezing/defrosting process the cooling plates 2 are in their lower rest position. The containers 8 likewise in the body arrangement 10. The two units (cooling plate assembly 1, body arrangement 10) can be brought together manually but preferably in automated fashion (FIG. 3). That is made possible for example by the fact that the spacing of the individual containers 8 is greater than a plate thickness, that is to say there is in addition an extra spacing so that they can be brought together. It is then advantageous for the cooling plates 2 and containers 8 to be brought together and contacted so that efficient heat/cold transfer becomes possible. That occurs by virtue of the fact that the lowermost cooling plate is lifted. That is effected with a direct plate drive (motion drive 6), preferably with a specific application of force, preferably a scissors lift or a lifting device under the lowermost cooling plate. The cooling plates 2 and containers 8 are displaced upwardly until the uppermost container 8 exerts pressure on the uppermost cooling plate 2. That ensures that the arrangement has passed through the entire compression cascade and there is contact at every location between cooling plate 2 and container 8.

The end point of that process is a compressed packet of cooling plates 2 and containers 8. It is then frozen and/or defrosted, preferably in an automated procedure.

After that process the contacting operation can take place in reverse, then the containers 8 and the cooling plates 2 move downwardly again into the respective lower rest point and can be easily separated from each other, preferably in automated fashion. A preferably heat-insulating closure cover is then fitted on the body arrangement 10 over the opening 4 to protect the interior.

The cooling plates 2 and the containers 8 as well as the holding devices 9 and the extensions 11 are not always denoted by a reference numeral in the individual Figures in order not to impair clarity of the Figures.

The invention claimed is:

1. A cooling plate assembly comprising:
cooling plates; and
a carrier,
wherein:
the cooling plates are mounted to the carrier so as to be movable perpendicularly to a longitudinal direction of the cooling plates; and
the cooling plates project freely away from the carrier so as to be introducible into a hollow body and removable from the hollow body via an opening by moving the carrier.

2. The cooling plate assembly as set forth in claim 1, wherein at least one of the cooling plates has a rectangular area.

3. The cooling plate assembly as set forth in claim 1, wherein at least one of the cooling plates is supported exclusively at an edge thereof.

4. The cooling plate assembly as set forth in claim 1, wherein the cooling plates are arranged one above another.

5. The cooling plate assembly as set forth in claim 1, further comprising a motion device configured to move the cooling plates perpendicularly to the longitudinal direction of the cooling plates.

6. The cooling plate assembly as set forth in claim 5, wherein the motion device is a scissor lift.

7. The cooling plate assembly as set forth in claim 1, wherein:
at least one of the cooling plates has temperature control passages or a temperature control medium; and
the cooling plate assembly further comprises an apparatus for cooling the temperature control medium or pumping the temperature control medium through the temperature control passages.

8. An assembly comprising:
the cooling plate assembly as set forth in claim 1; and
a body arrangement for holding containers to be cooled, the body arrangement including: (i) the hollow body; and (ii) holding devices for spaced holding of the containers in the hollow body,
wherein the holding devices are arranged in the hollow body such that the cooling plates are introducible and removable from the hollow body, between the containers, via the opening.

9. A method of temperature control of material in containers using the cooling plate assembly as set forth in claim 1, the method comprising:
holding the containers in the hollow body;
introducing the cooling plates into the hollow body between the containers; and
temperature-controlling the containers together with the material therein by the cooling plates.

10. The cooling plate assembly as set forth in claim 5, wherein the motion device is supported on the carrier.

11. The assembly as set forth in claim 8, wherein the holding devices are projections in the hollow body for supporting the containers.

12. The assembly as set forth in claim 11, wherein the projections are parallel to an introduction direction for the containers.

13. The assembly as set forth in claim 8, wherein the cooling plates are displaceable such that at least one of the cooling plates can contact at least one of the containers which is adjacent to the at least one of the cooling plates.

14. The assembly as set forth in claim 8, wherein the hollow body is made from a heat-insulating material.

15. The assembly as set forth in claim 8, further comprising the containers.

16. The assembly as set forth in claim 11, wherein the holding devices are configured to support the containers one above another.

17. The assembly as set forth in claim 15, wherein:
the holding devices are projections in the hollow body for supporting the containers; and
the containers have extensions for resting on the projections.

18. The assembly as set forth in claim 13, wherein the cooling plates are liftable such that the at least one of the cooling plates can contact the at least one of the containers.

19. The assembly as set forth in claim 15, wherein the cooling plates and the containers are displaceable such that at least one of the cooling plates can contact at least one of the containers which is adjacent to the at least one of the cooling plates.

20. The assembly as set forth in claim 8, wherein the cooling plates are displaceable such that the cooling plates can contact the containers, respectively.

21. The method as set forth in claim 9, wherein the temperature-controlling is at least one of freezing or defrosting.

22. The method as set forth in claim 9, wherein the material is a liquid.

* * * * *